United States Patent
Conroy et al.

[15] 3,650,226
[45] Mar. 21, 1972

[54] DOCUMENT DESTRUCT FILE

[72] Inventors: John P. Conroy, Cincinnati; Kendall H. Grimes, Oxford; Robert W. Maynard, Cincinnati, all of Ohio

[73] Assignee: The Mosler Safe Company, Hamilton, Ohio

[22] Filed: Nov. 12, 1970

[21] Appl. No.: 88,671

[52] U.S. Cl. ................................. 109/25, 109/36, 312/236
[51] Int. Cl. ........................................... E05g 1/00
[58] Field of Search ................. 109/33, 35, 25, 36, 37; 312/236

[56] References Cited

UNITED STATES PATENTS 1,445,975  2/1923  Salmon ........................... 109/29
1,564,348  12/1925  Hill ................................. 109/29
2,190,229  2/1940  Bradley ........................... 109/33

*Primary Examiner*—Reinaldo P. Machado
*Attorney*—Wood, Herron & Evans

[57] ABSTRACT

A security file so constructed as to facilitate expeditious destruction of documents and materials contained in the file. The file contains oxidizing panels which, upon ignition, burn and destroy the contents of the file. A flue extends along the back or the side walls and along the bottom of the cabinet. Containers of water are located in the bottom of the cabinet. The containers are made from a relatively low melting temperature material so that ignition of the oxidizing panels causes the containers to melt and the water contained in the containers to spill out and fill a portion of the flue chamber through which the gases of combustion must pass and be cooled before exiting from the cabinet.

28 Claims, 12 Drawing Figures

PATENTED MAR 21 1972

INVENTORS
John P. Conroy
Robert W. Maynard
BY Kendall H. Grimes
Wood, Herron & Evans
ATTORNEYS

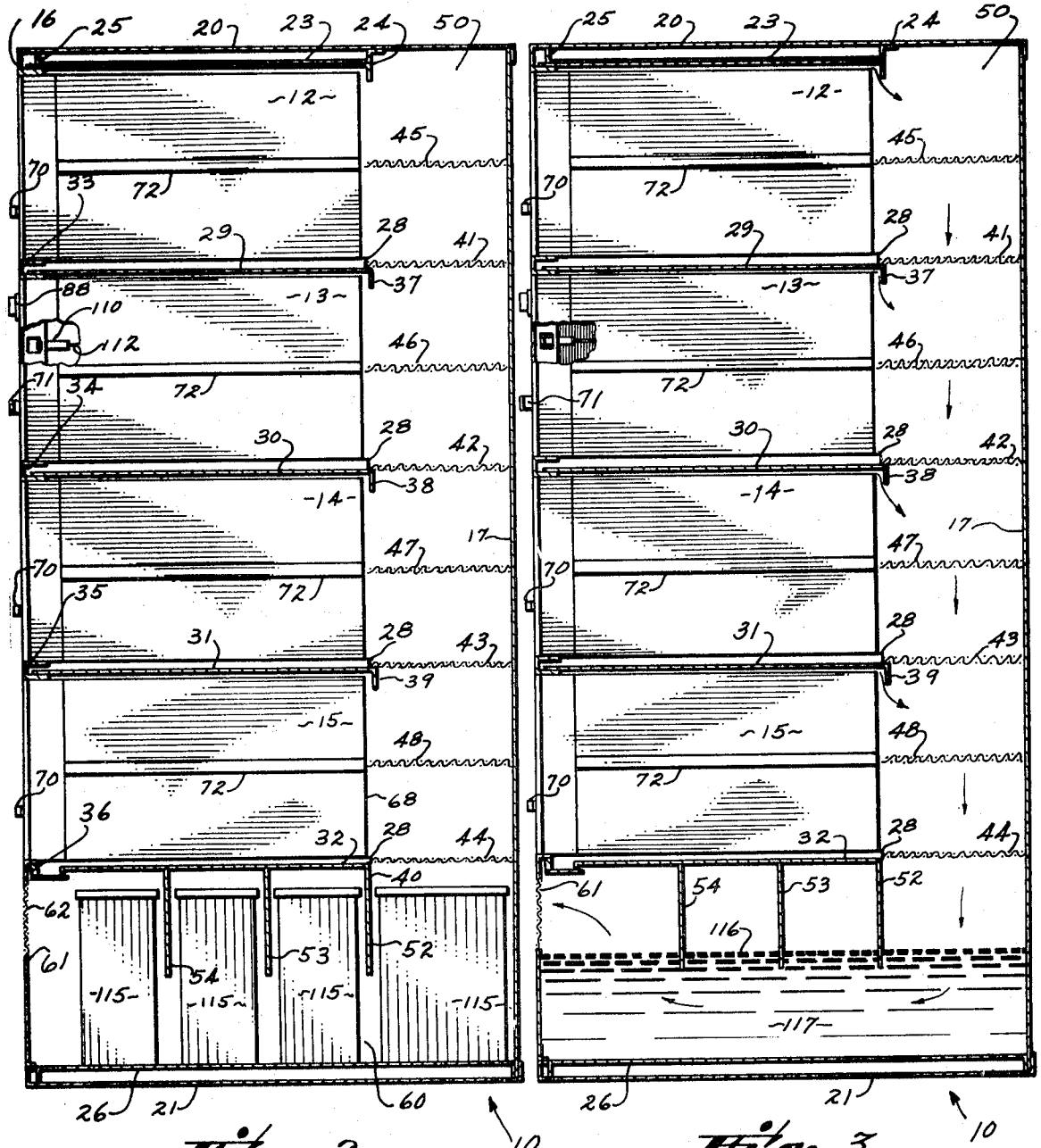
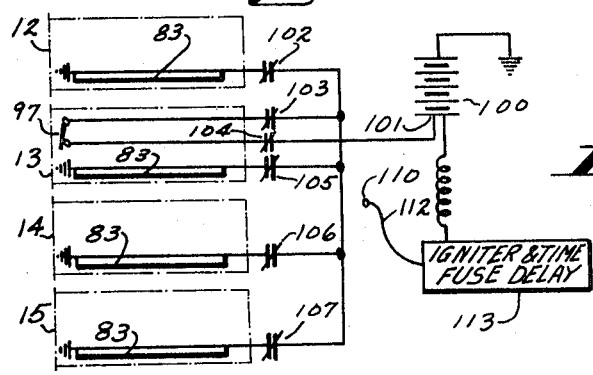

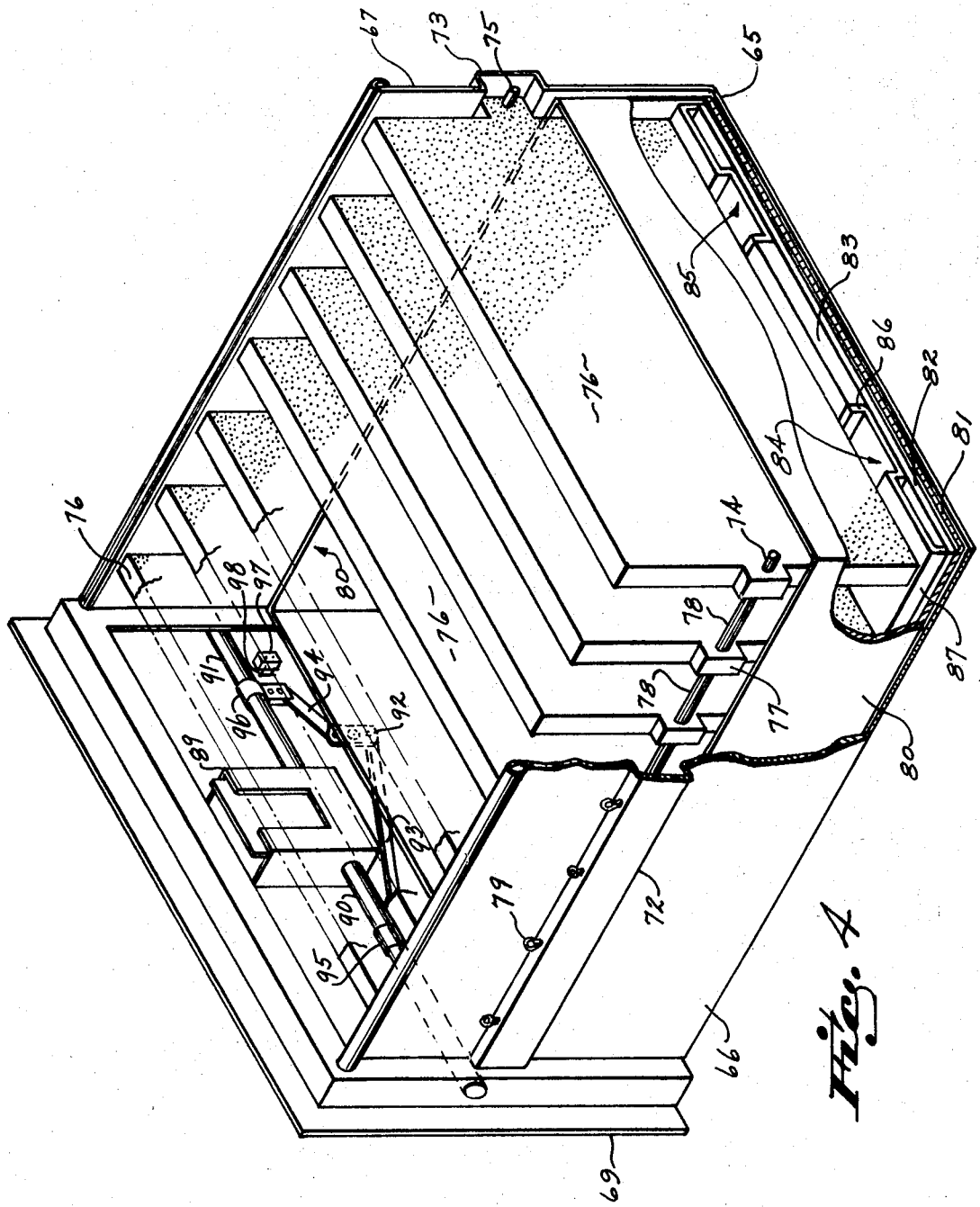

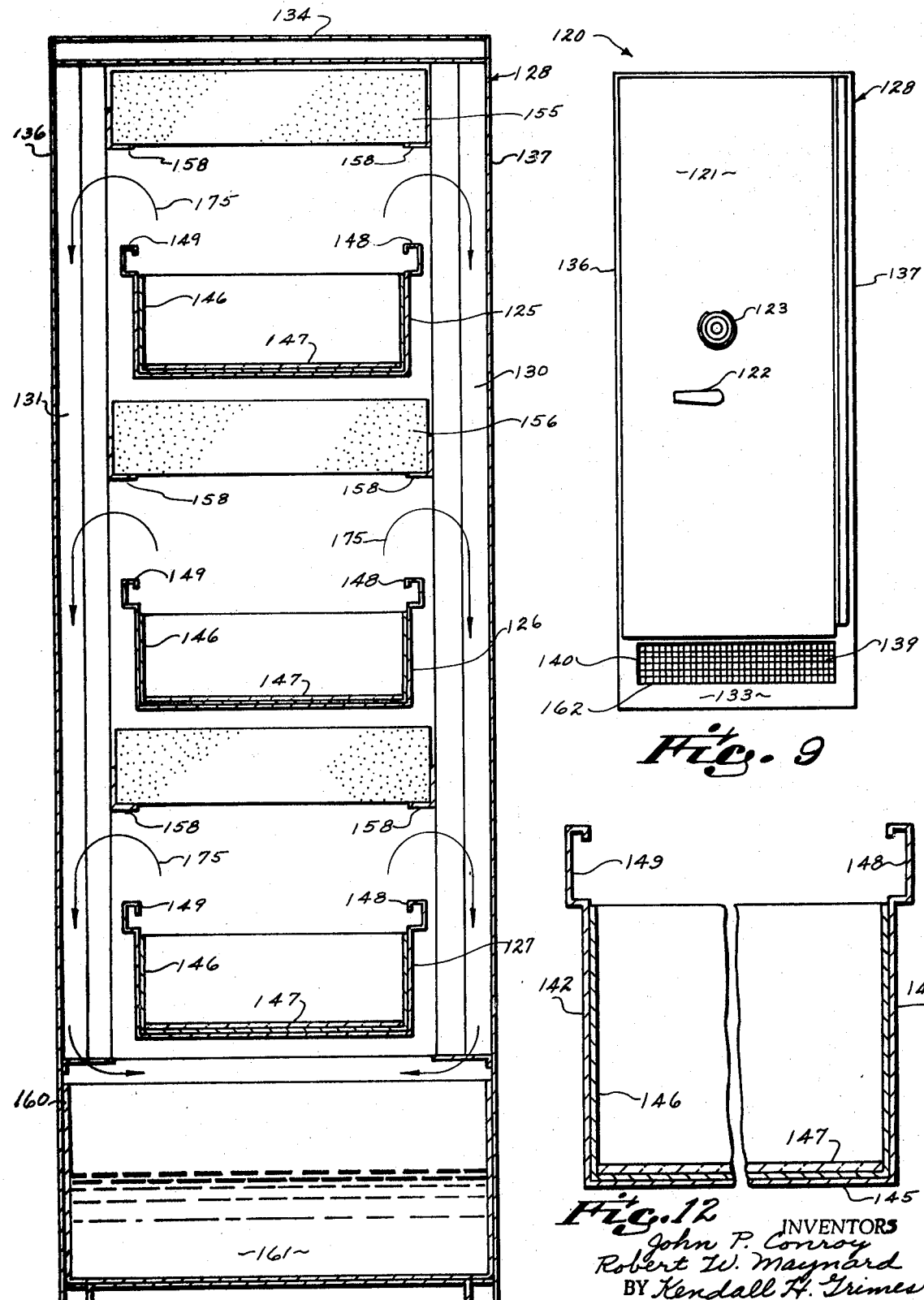

DOCUMENT DESTRUCT FILE

This invention relates to security files and particularly to files which are intended to store top security documents in sites which are subject or vulnerable to surprise enemy attacks. Such sites are exemplified by embassies located in foreign countries or files located aboard ships or planes which are subject to surprise enemy attack. Files in such sites often contain code books, decoded messages, computer programs or security files which have no great value unless they fall into the wrong hands. Similarly, documents contained in files aboard ship often contain code books and security files which have no great monetary value except in enemy hands. To avoid or minimize the chance of such materials being captured by an unfriendly person or government, the person in charge of the file is generally instructed to destroy the contents if there is any danger of their being captured and to that end he generally has available a device for destroying documents or materials contained in the file. One of the most common document destruct systems available for this purpose is a paper shredder which shreds all documents and material fed into it such that they cannot be reconstructed from the remains. Another common device is one which incinerates or burns the documents beyond recognition. Both of these document destruction type of devices or systems are subject to the shortcoming that they require a great deal of paper handling and a great deal of time to extract the documents from the files and to feed them into the document destruct device whether it is one which burns or shreds the contents. Consequently, surprise attacks on the sites of such security files have in the past resulted in an unfriendly government or unfriendly parties obtaining files which were intended to be destroyed and which were in the process of being destroyed. Inevitably, the capture of the documents or materials occurred because of the facility or site of storage of the documents being captured before the person in charge had time to complete the destruction of the contents of the files.

It has therefore been an objective of this invention to provide a document destruct security file which may be triggered and which destroys the documents contained in the file without any time consuming handling of the documents. More specifically, it has been an objective of this invention to provide a document destruct device which is built into a security file so that the documents may be destroyed without removal from the file.

Another objective of this invention has been to provide a document destruct device built into a filing cabinet which is capable of oxidizing or burning the contents of the file without creating an excessive fire hazard. The complete oxidation or burning and destruction of the documents or materials contained in the file requires that a great deal of heat and oxygen be generated interiorly of the file. The gases in the file during oxidation are, of course, very hot and must somehow be permitted to exit from the file but without creating an excessive fire hazard in the vicinity of the file.

One aspect of this invention is therefore predicated upon the concept of a document destruct type of filing cabinet which incorporates an oxidizing medium into the cabinet but which does so with the minimum of fire hazard. To minimize the fire hazard, the gases evolved during the burning or destruction of the contents of the file are ejected from the bottom front of the file cabinet, away from walls which may be subject to burning. Before being ejected from the cabinet, the gases are passed through a cooling chamber, preferably a water chamber located in the bottom of the cabinet. The water is stored in meltable containers until ignition of the oxidizing medium contained in the cabinet. Upon the triggering of the oxidation medium, the containers melt or are opened and the water is then allowed to escape into the bottom of the cabinet where it effects cooling of the gases emitted from the front of the file. Preferably, the gases evolved from the burning or oxidation of the contents of the file are forced to pass through the water or be bubbled through it and be cooled before they can escape from the file cabinet. This materially cools the gases and minimizes any fire hazard which otherwise might result from the destruction of the contents of the file by an oxidation or burning technique.

Still another objective of this invention has been to minimize the cost of a document destruct file which has a built in document destruct feature. This objective is accomplished in one modification by foreshortening the drawers of a standard security file. The foreshortened drawers then provide a flue at the back of the drawers between the back of the drawers and the back of the filing cabinet. The space normally provided for the bottom drawer is occupied by the cooling chamber through which the combustion gases are passed before exiting from the file cabinet. This construction of the file minimizes the cost which would otherwise be incurred in building special cabinets for this type of security file.

To minimize personnel hazards which might result from inadvertent firing or ignition of the oxidizing panels contained in the file, this invention incorporates a safety interlock. This interlock precludes triggering or ignition of the oxidizing panels unless all of the drawers of the file are closed and the file is locked. In this condition of the file, hot gases evolved by the oxidizing materials in the file can only pass out through the front opening and only after passage through the cooling chamber in the bottom of the cabinet.

These and other objects and advantages of this invention will be more readily apparent from the following description of the drawings in which:

FIG. 2 is a cross sectional view through the file of FIG. 1.

FIG. 3 is a view similar to FIG. 2 but illustrating the condition of the file after ignition of the oxidizing panels.

FIG. 4 is a perspective view partially broken away of one file drawer of the security file.

FIG. 8 is an electrical circuit diagram of the control circuit for igniting the oxidizing panels.

FIG. 9 is a front elevational view of a second modification of a file incorporating the invention of this application.

FIG. 11 is a cross sectional view through the file taken on line 11—11 of FIG. 10.

FIG. 12 is a cross sectional view through one file drawer of FIG. 11.

Figure 1:
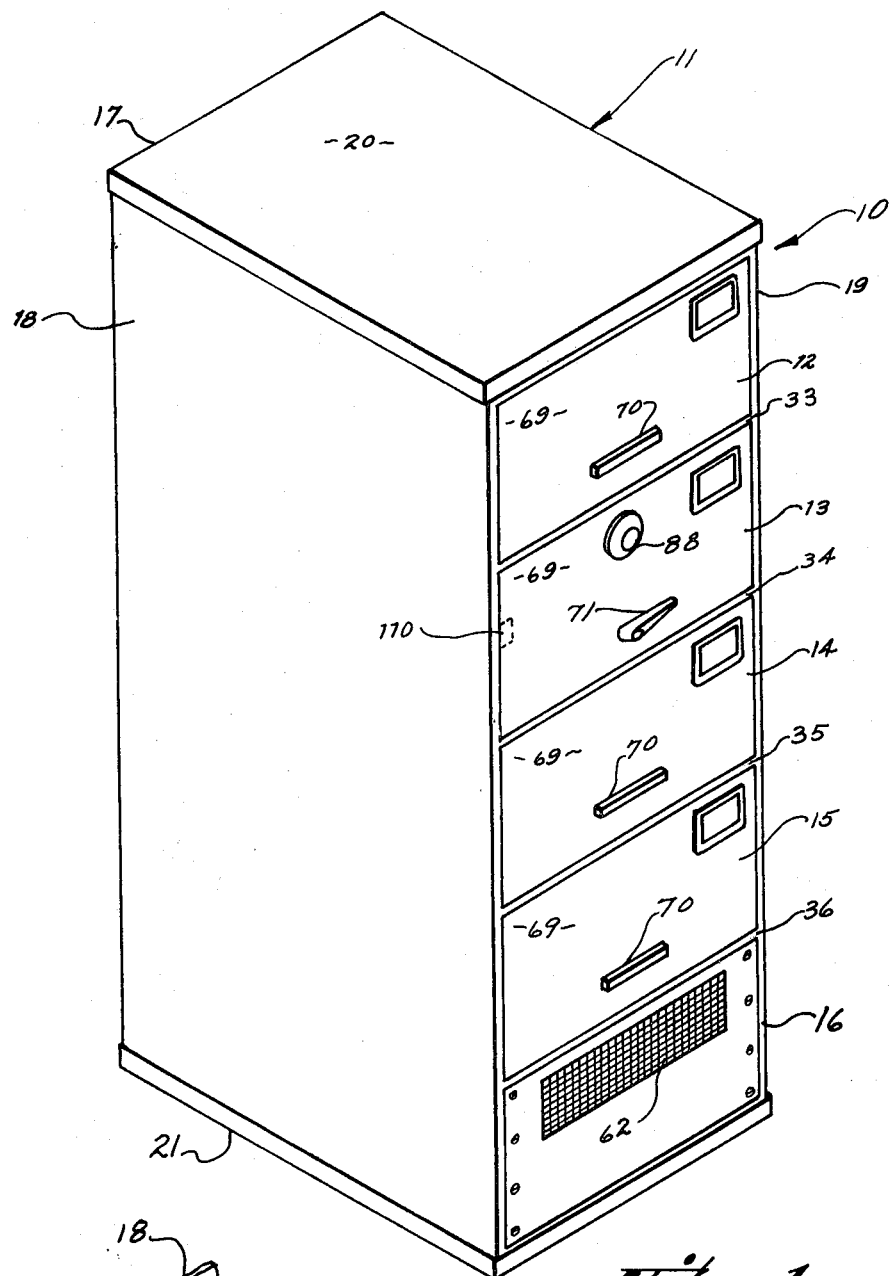
FIG. 1 is a perspective view of a security file incorporating the invention of this application.

Referring first to FIGS. 1-6, there is illustrated a drawer type of security file 10 embodying the invention of this application. In this modification, the invention is illustrated and described in connection with a drawer style of file. It is equally applicable, though, to a door or safe style of file of the type illustrated in FIGS. 9-12. Both styles of files are commonly employed in the storage of documents and materials which have top security ratings and which should be destroyed in preference to allowing them to come into the possession of unfriendly parties. The invention of this application is intended to permit the rapid and complete destruction of the contents of the file upon initiation of a trigger. Such destruction is, of course, an emergency measure and not intended to be used but once in the useful life of any file.

The drawer style file 10 comprises cabinet 11 within which there are four slideable drawers 12, 13, 14, and 15. The cabinet comprises a front wall 16, a rear wall 17, side walls 18 and 19, a top wall 20 and a bottom wall 21. In the preferred embodiment, as shown in FIG. 2, the top wall is reinforced by a parallel inner liner wall 23 secured to the top and front walls by brackets 24 and 25. Similarly, the bottom of the file is reinforced by a parallel inner wall 26 welded or otherwise secured to the front and side walls of the file.

Each of the file drawers 12, 13, 14 and 15 is slideable upon a slideway 28 mounted in the cabinet. The slideways are conventional and therefore have not been illustrated in detail.

Horizontal partition panels 29, 30, 31 and 32 are mounted interiorly of the cabinet beneath each of the file drawers. These panels are rigidly secured to the side walls 18 and 19 of the cabinet and are generally located in the horizontal plane of the front wall dividers 33, 34, 35 and 36. Each partition panel has a downwardly extending vertical flange 37, 38, 39, and 40 along its rear edge. An expended wire screen 41, 42, 43, and 44 extends between each flange 37–40 and the rear wall 17 of the cabinet. These screens, together with four additional screens 45, 46, 47 and 48 located immediately above and generally parallel to the screens 41–44, are all rigidly secured to the cabinet of the file and are located in a vertical flue chamber 50 defined between the rear of the file drawers and the rear wall 17 of the cabinet. As is explained more fully hereinafter, these screens serve to catch the oxidation products which result from burning of the contents of the file and prevent them from accumulating and clogging the flue.

There are three transverse partition panels or baffles 52, 53 and 54 secured to the bottom of the lower partition panel 32. These baffles extend downwardly from the lower partition panel 32 and are welded or otherwise fixedly secured to it and to the side walls of the cabinet. The baffles extend approximately halfway to the bottom inner wall 26. They terminate short of the inner wall 26 so as to permit combustion products and gases evolved from oxidation to escape through the vertical flue chamber 50, via a horizontal flue path 60 across the bottom of the file, and out a screened exhaust port 61 in the front wall 16 of the file cabinet. A protective expanded wire screen 62 is mounted in the front wall 16 and covers the port 61.

Four containers 115 of water are located in the bottom of the cabinet. These containers are made from a meltable material, such as polyethylene, which melts at a temperature below the temperature created interiorly of the file by the document destruct system, as is explained more fully hereinafter. Sealed covers over the containers 115 prevent evaporation of the water while it is stored in the bottom of the file.

Each drawer is generally tray shaped and comprises a bottom wall 65, a pair of side walls 66, 67, a front wall 69, and a rear wall 64 which is one half the height of the other walls. A screen may extend from the top of the rear wall 64, upwardly to the top of the drawer. A handle 70 is secured to the front wall 69 of all drawers except the locking drawer 13. The locking drawer 13 has a bolt actuating handle 71 in lieu of a fixed handle 70.

Each of the side walls 66–67 of each of the drawers has an outwardly extending rail 72, 73 formed by a U-shaped section of the side wall. These rails support guide rods 74, 75 upon which oxidizing panels 76 are mounted.

The oxidizing panels 76 are conventional aluminum clad nitrate oxidizing panels. The aluminum cladding covers conventional nitrate oxidizing panels and has ears or tabs 77 which extend outwardly from both sides of the panels into the recesses formed by the rails 72, 73. The ears 77 are apertured so as to fit over the guide rods 74, 75. Spacers 78 on the guide rods hold the panels in spaced relation. Additionally, the panels are locked onto the guide rods by cotter pins 79 which extend through the side rails 72, 73 of the drawers and through the guide rods 74, 75. The spacing of the oxidizing panels is such that they serve as dividers in the drawers. The number of oxidizing panels in each drawer and their spacing is contingent upon the contents intended to be stored in the drawer and the density with which those materials are to be stored. In one preferred embodiment, there are seven equidistantly spaced oxidizing panels located in each of the four file drawers.

The bottom of each of the file drawers is reinforced by a heavy gauge metal tray 80. This tray has a bottom wall, side walls, a front wall, and a rear wall 68. These walls extend upwardly for approximately one-half the height of the drawer. This tray shaped insert retains the nitrate oxidizing panels in the drawer and prevents them from burning through the thin sheet metal bottom of the drawer after ignition. Retention of the molten oxide in the tray ensures the complete destruction of the contents of the drawer before the molten material can burn through the bottom 65. To further ensure that the molten oxide material does not burn through the bottom of the file, there is an asbestos insulative pad 82 which covers the bottom of the insert 80.

In order to ignite the oxidizing panels 76, there is a conventional electrically actuated igniter 83 mounted in the bottom of each of the drawers. This igniter extends for the full length of the drawer and is held in place by a pair of Z-shaped brackets 84, 85. The brackets 84, 85 extend for the full length of the drawer and each has one vertical edge 86 which rests against one side of the igniter 83 and another vertical edge 87 which rests against a side wall of the tray 80. The brackets thus preclude lateral movement of the igniter 83 in the drawer.

All of the drawers 12–15 are identical except for the second drawer 13 which includes the mechanism for locking the file cabinet. Specifically, it includes a conventional combination lock 88 mounted in the front 69 of the drawer and enclosed within a housing 89 on the back face of the drawer front. It also differs in that it includes the rotatable handle 71 for controlling movement of lock bolts 90–91. A pivoted bracket 92 is fixedly mounted on the rear of the spindle of the handle 71. This bracket 92 is connected by a pair of links 93, 94 and a pair of brackets 95, 96 to the bolts 90, 91. Upon rotation of the handle 71 and of the connected pivoted bracket 92, the bolts 90, 91 are caused to move together or to move apart depending upon the direction of rotation of the handle. They can only be moved together or to an unlocked position when the bolt of the combination lock 88 is in an open condition.

An inner lock switch 97 is mounted on the inside of the front wall 69 of the lock drawer 13 in a position to be engaged by the bracket 96 of bolt 91. When the bolt is in a locked position, the bracket 96 contacts the actuator 98 of switch 97 and effects closing of the switch. When the bolt is in a locked position, the bracket 96 contacts the actuator 98 of the switch 97 and effects closing of the switch.

Referring now to FIG. 8, it will be seen that the switch 97 connects one pole 101 of a thermal battery 100 to the igniters 83 and to ground through switches 102, 103, 104, 105, 106 and 107 located on the file at the back of the drawers. Closing of the drawer 12 effects closing of the contacts of the switch 102. Closing of the drawer 13 effects closing of the contacts of the switches 103, 104 and 105. Similarly, closing of the drawers 14, 15 effects closing of the contacts of the switches 106 and 107, respectively.

Figure 7:
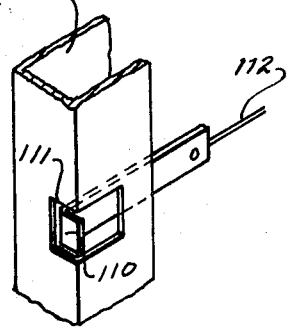
FIG. 7 is a fragmentary perspective view of the oxidizing panel trigger.
Figure 5:
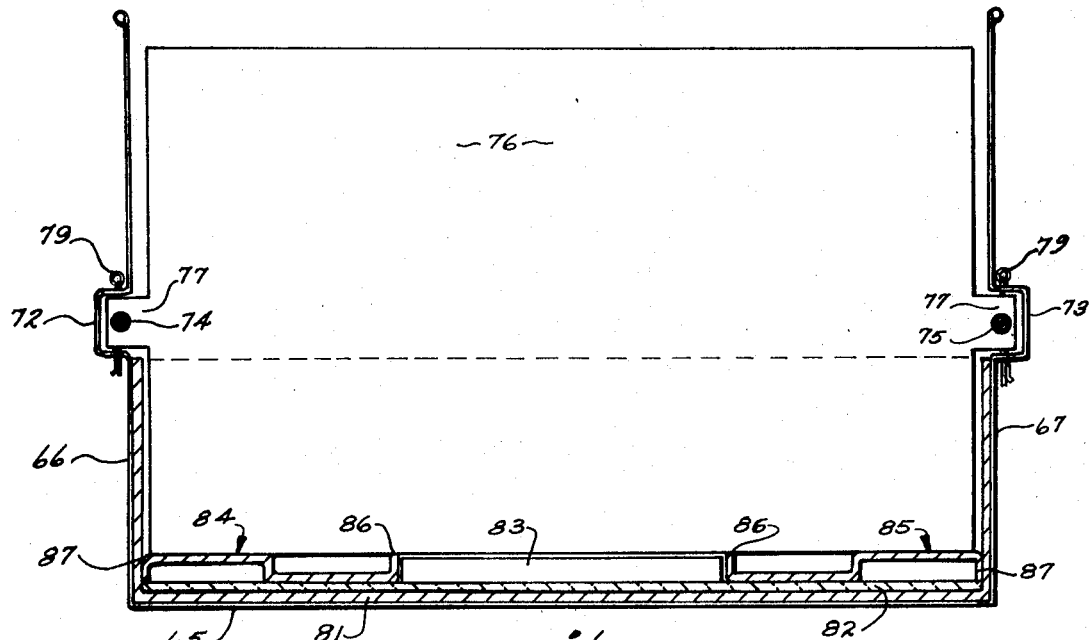
FIG. 5 is a cross sectional view through a security file drawer.
Figure 6:
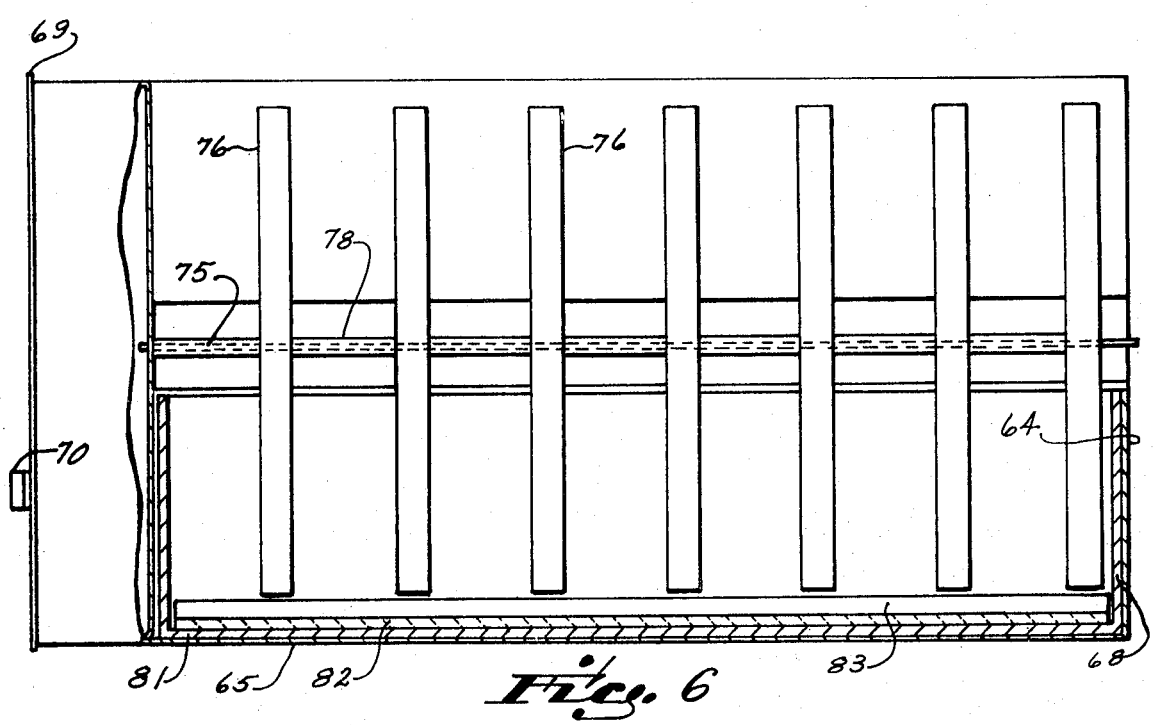
FIG. 6 is a side elevational view, partially broken away, of one of the security file drawers.
Figure 10:
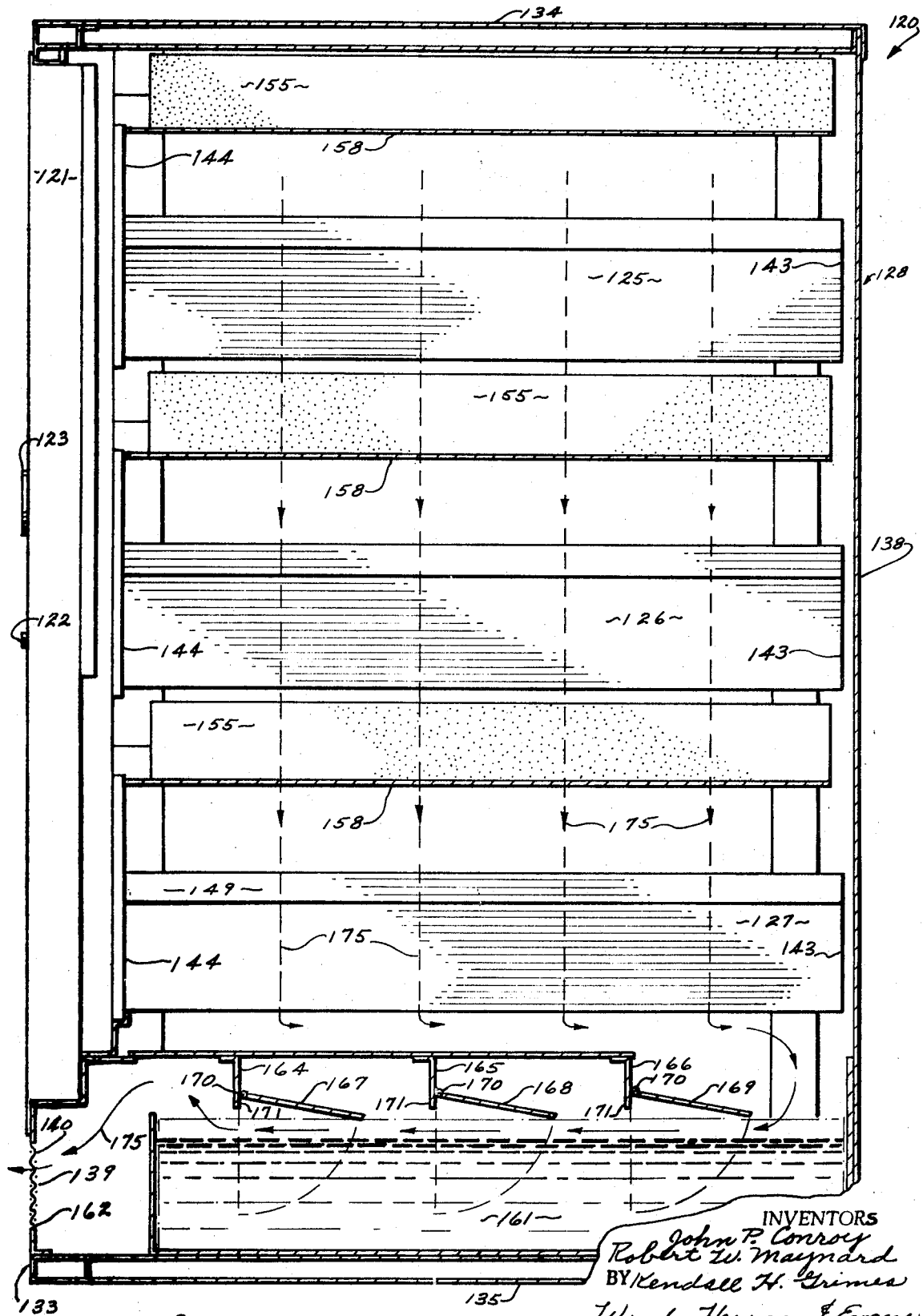
FIG. 10 is a cross sectional view taken on line 10—10 of FIG. 9.

In order to actuate the thermal battery 100, there is a trigger 110 located immediately behind the front plate 69 of the drawer 13. As may be seen in FIG. 7, this trigger 110 is slideably mounted on the side wall 18 of the cabinet and extends through an aperture 111 in the front wall. It is connected by a cable 112 to an igniter and time delay fuse 113 for activating the thermal battery 100.

In operation, destruction of the materials contained in the file only occurs when all of the drawers are closed. To trigger the destruction of the documents, though, the file drawer 13 must be opened and the trigger 110 pulled outwardly. After a predetermined delay (in one preferred embodiment the delay is approximately two minutes), the igniter and time delay fuse activates the thermal battery 100. Upon subsequent closing of the file drawer 13 and actuation of the handle 71 so as to move the bolts 90, 91 outwardly, the switch 97 is closed. As is conventional in security files, the bolts 90, 91 can only be moved outwardly when all of the drawers of the file are closed. Closing of the drawer 13 and locking of the file cabinet connects the igniters 83 in the drawers through the switches 102–107 to ground. This connection of the positive pole of the battery to ground through the igniters 83 activates the igniters 83 which in turn ignite the oxidizing panels 76. Oxidation of the panels 76 occurs as a result of a chemical reaction which releases oxygen and heat in amounts sufficient to burn and destroy all of the materials stored in the file. The heat generated by the panels interiorly of the file is also sufficient to melt the storage containers 115 located in the bottom of the file and release the water stored in the containers. This water then forms a large bath 117, as illustrated in FIG. 3, the top 116 of which is located above the lower horizontal plane of the baffles 52–54. Gases evolved from the oxidation of the panels 76 and from burning or oxidation of the materials stored in the file pass downwardly through the flue 50 and are bubbled through the water bath 117 in flue 60 before escaping from the file through the screened opening 61 in the front of the cabinet. In the course of passing through the water, the gases are cooled to a safe temperature, as, for example, a temperature from 200° F. to 500° F. depending upon the temperature generated by the oxidizer panels, the contents of the file, the density with which the contents are stored, etc. The gases which pass out of the opening 61 are generally so hot, though, as to prevent anyone from trying to open the front of the drawer in an attempt to stop the destruction of the materials stored in the file after destruction has been initiated by pulling the trigger 110 and locking the file.

Referring now to FIGS. 9–12, there is illustrated a second modification of security file incorporating the invention of this application. In this modification, the file 120 is of the hinged door type. It includes a door 121 which when closed may be locked by a handle 122 actuated bolt and combination lock 123 so as to preclude access to three drawers 125, 126 and 127 slideably mounted in the cabinet 128 of the file.

The cabinet 128 is generally similar to the cabinet 11 of the modification of FIGS. 1–8. It differs from that cabinet, though, in that it has a single door which forms a portion of the front wall of the file. It also differs in that it has a pair of flues 130 and 131 built into the side walls of the cabinet rather than a single flue between the rear of the drawers and the rear wall of the cabinet. The cabinet 128 is similar to the file cabinet 11 of the modification of FIGS. 1–8 in that it includes a front wall 133, a top wall 134, a bottom wall 135, a pair of side walls 136 and 137 and a rear wall 138. It also has a flue opening 139 in the bottom front wall of the cabinet, which opening is covered by a grill or grate of expanded wire 140.

In this modification there are three drawers rather than four drawers slideably mounted in the file. These drawers 125–127 differ from the drawers of the modification of the FIGS. 1–6 in that they extend for the full depth of the file cabinet but have shallow or short side walls so as to permit sidewise flow of gases evolved during oxidation of the oxidizing panels and of the contents of the file to the flues 130 and 131 in the side walls of the file cabinet. Specifically, and as may be seen most clearly in FIGS. 10 and 12, each drawer comprises side walls 141 and 142, a rear wall 143, a front wall 144 and a bottom wall 145. The side walls terminate in channel shaped sections 148 and 149. A reinforcing tray 146, identical to the metal tray 80 of the modification of FIGS. 1–8, is located in the interior of each file drawer. There is also an asbestos pad 147 in the bottom of each tray.

The oxidizing panels 155, 156 and 157 of this modification are identical in chemical composition to the panels 76 of the modification of FIG. 1. In this modification, though, the oxidizing panels together with the ignition panels for igniting each of the oxidizing panels are fixedly mounted in the cabinet 128 above each of the file drawers. Specifically, the oxidizing panels are mounted on brackets 158 which are fixedly secured to the side walls of the cabinet. This construction and location of the oxidizing panels has some advantages over location of the panels on the interior of the drawer. Specifically, it enables the oxidizing panels during oxidation and liquidification to flow down over the contents of the drawers so as to more completely destroy those contents. This construction also enables larger objects to be stored in the drawers since there are no panels dividing the drawers into small compartments. It also has the advantage of maintaining the oxidizing panels and, specifically, the ignition panels permanently wired to the triggering circuit. Consequently, there is less chance of a misfire because of poor electrical contact at the rear of the drawers.

As in the case of the modification of FIGS. 1–8, there is a water tight storage compartment 160 in the bottom of the file cabinet. The water or liquid is preferably stored in air tight meltable containers which, upon initiation of destruction of the contents of the files, melts and releases the water 161 into the compartment 160. When thus released, the water level is just below the bottom edge 162 of the opening 139 in the front wall of the cabinet.

As in the case of the modification of FIGS. 1–8, there are three baffles 164, 165, 166 which extend transversely across the bottom of the file. In this modification, though, the baffles are hinged, as is illustrated best in FIG. 10, so that the lower halves 167, 168 and 169 float upwardly in the water about hinges 170. The fixedly mounted upper portion 171 of each baffle extends below the hinge so as to prevent the hinged lower plates from being moved upwardly in any direction other than a rearward direction. In this way gases and oxidation products can only escape via the paths indicated by the arrows 175 as they pass through the water. Pressure greater than atmospheric pressure tends to force the baffles down into the water and cannot cause the baffles to lift. Thus, oxidation products cannot escape from the file except by passing through the water 161.

This invention has been described in connection with a three-drawer and a four-drawer security file but it is equally applicable to other types of security files, as, for example, single door safe types of files. It is also possible to build a flue into the rear or sides of the cabinet in lieu of fore-shortening the drawers contained in the file, as illustrated in the embodiment of FIGS. 1–8. The liquid bath 117 may be maintained at all times in the bottom of the cabinet but it is preferred that the liquid be stored in air tight containers so that it does not evaporate and does not create a rust or leakage problem.

Location of the opening or vent 61 in the front of the cabinet has the advantage of forcing the hot gases generated by the oxidizing panels to pass out of the front of the cabinet away from walls which would otherwise create a fire hazard. Forcing the gases to pass through a liquid bath and be cooled further reduces the fire hazard. The foreshortened drawers of the file enable a conventional security file cabinet to be utilized in lieu of a special file cabinet.

While we have described only a single preferred embodiment of the invention, persons skilled in the art to which this invention pertains will readily appreciate changes and modifications as well as applications to other styles of security files. Therefore, we do not intend to be limited except by the scope of the appended claims.

Having described our invention, we claim:

1. A multiple drawer security file comprising
   a cabinet having side walls, a top and a bottom wall, a rear wall, a lower front wall, and multiple horizontal drawer slideways located above said front wall,
   drawers slideably mounted in said slideways, each of said drawers having a bottom wall, front wall, side wall and a rear wall, partition panels located between the bottom of each drawer and the top of the next adjacent drawer, said partition panels terminating at the rear substantially short of the rear wall of said cabinet,
   oxidizer panels mounted within the file, said oxidizer panels being operable upon ignition to oxidize and destroy the contents of the drawers of the file,
   said drawers being substantially shorter from said front wall of said drawer to said rear wall of said drawer than the distance from said front wall of said cabinet to said rear wall of said cabinet so that there is a substantial open area behind each drawer when it is closed,
   a flue at the rear of the file located between the rear of the drawers and the rear wall of the cabinet, said flue extending for approximately the full height of the cabinet and being open at the bottom and closed at the top to permit the egress of oxidation products during oxidation and destruction of the contents of the file.

2. The security file of claim 1 in which said flue extends beneath the lowermost drawer in the file and in which there is an opening in said lower front wall of the cabinet open to said flue.

3. The security file of claim 2 in which that portion of the flue which extends beneath the lowermost drawer includes a liquid containing chamber for cooling oxidation products before they pass out of said lower front wall opening.

4. The security file of claim 3 which further includes means for forcing all oxidation products through liquid contained in said chamber before said products may escape through said front opening.

5. The file of claim 3 which further includes at least one liquid storage container in said chamber, at least a portion of said container being meltable at a temperature below the temperature generated by said oxidizer panels so that the liquid stored in said container is released into said chamber upon ignition of said oxidizer panels.

6. The security file of claim 5 which further includes means for forcing all oxidation products through liquid released from said container before said products may escape through said front opening.

7. The file of claim 1 which further includes an electrical device for igniting said oxidation panels, said electrical ignition device including a control circuit for controlling actuation of said device, said control circuit including interlock means operable to insure that each drawer is closed before said device may be actuated to ignite said oxidation panels.

8. The file of claim 7 in which said interlock means includes a switch connected to the lock of the file, which switch is closed only when the file is locked.

9. A multiple drawer security file comprising
a cabinet having side walls, a top and a bottom wall, a rear wall, a front wall, and multiple horizontal drawer slideways located above said front wall,
drawers slideably mounted in said slideways, each of said drawers having a bottom wall, front wall, side wall and a rear wall,
oxidizer panels mounted within the file, said oxidizer panels being operable upon ignition to oxidize and destroy the contents of the drawers of the file,
a flue at the rear of the file located between the rear of the drawers and at least a portion of the rear wall of the cabinet, said flue extending for approximately the full height of the cabinet,
said flue having an opening in said cabinet near the bottom thereof communicating with said flue, said cabinet opening being operable to permit the egress of oxidation products during oxidation and destruction of the contents of the file.

10. The security file of claim 9 in which said flue extends beneath the lowermost drawer in the file and in which said cabinet opening is located in the cabinet front wall.

11. The security file of claim 9 which further includes a liquid containing chamber for cooling oxidation products before they pass out of said cabinet opening.

12. The security file of claim 11 which further includes means for forcing all oxidation products through liquid contained in said chamber before said products may escape through said front opening.

13. The file of claim 11 which further includes at least one liquid storage container in said chamber, at least a portion of said container being meltable at a temperature below the temperature generated by said oxidizer panels so that the liquid stored in said container is released into said chamber upon ignition of said oxidizer panels.

14. The security file of claim 13 which further includes means for forcing all oxidation products through liquid released from said container before said products may escape through said cabinet opening.

15. The file of claim 9 which further includes an electrical device for igniting said oxidation panels, said electrical ignition device including a control circuit for controlling actuation of said device, said control circuit including interlock means operable to insure that each drawer is closed before said device may be actuated to ignite said oxidation panels.

16. The file of claim 15 in which said interlock means includes a switch connected to the lock of the file, which switch is closed only when the file is locked.

17. A security file comprising
a cabinet having side walls, a top and a bottom wall, a rear wall and a front wall,
movable access means defining at least a portion of the front wall and operable when moved to an open position to permit access to materials stored in the file,
a document storage area located in the file,
oxidizer panels mounted within the file, said oxidizer panels being operable upon ignition to oxidize and destroy the contents of the file,
a flue located between the document storage area and at least a portion of one wall of the cabinet, said flue extending for approximately the full height of the cabinet,
an opening in said cabinet near the bottom of the file and communicating with said flue, said cabinet opening being operable to permit the egress of oxidation products during oxidation and destruction of the contents of the file.

18. The security file of claim 17 in which said flue extends beneath the document storage area in the file and in which said cabinet opening is located in the cabinet front wall.

19. The security file of claim 17 which further includes a liquid containing chamber for cooling oxidation products before they pass out of said cabinet opening.

20. The security file of claim 17 which further includes means for forcing all oxidation products through liquid contained in said chamber before said products may escape through said front opening.

21. The file of claim 17 which further includes at least one liquid storage container in said chamber, at least a portion of said container being meltable at a temperature below the temperature generated by said oxidizer panels so that the liquid stored in said container is released into said chamber upon ignition of said oxidizer panels.

22. The file of claim 17 which further includes an electrical device for igniting said oxidation panels, said electrical ignition device including a control circuit for controlling actuation of said device, said control circuit including interlock means operable to insure that each drawer is closed before said device may be actuated to ignite said oxidation panels.

23. The file of claim 21 in which said interlock means includes a switch connected to the lock of the file, which switch is closed only when the file is locked.

24. The security file of claim 17 in which the flue is defined between the storage area and at least one side wall of the cabinet and in which said oxidizing panels are mounted above the storage area.

25. The security file of claim 17 in which the document storage area is defined by drawers slideable in said cabinet and in which said oxidizer panels are mounted above each of said drawers.

26. The security file of claim 25 in which the access means is a door hingedly mounted on the front of the file.

27. The security file of claim 26 which further includes a liquid containing chamber for cooling oxidation products before they pass out of said cabinet opening.

28. The security file of claim 26 which further includes means for forcing all oxidation products through liquid contained in said chamber before said products may escape through said front opening.

* * * * *